United States Patent
Richter et al.

(10) Patent No.: US 10,579,548 B2
(45) Date of Patent: Mar. 3, 2020

(54) ADAPTIVE INTERLEAVING OF DATA TRANSFER REQUESTS

(71) Applicant: WESTERN DIGITAL TECHNOLOGIES, INC., San Jose, CA (US)

(72) Inventors: Elkana Richter, Tene-Omarim (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/940,338

(22) Filed: Mar. 29, 2018

(65) Prior Publication Data

US 2019/0303310 A1 Oct. 3, 2019

(51) Int. Cl.
   *G06F 13/16* (2006.01)
   *G06F 3/06* (2006.01)
   *G06F 12/06* (2006.01)

(52) U.S. Cl.
   CPC .......... *G06F 13/1647* (2013.01); *G06F 3/061* (2013.01); *G06F 3/0659* (2013.01); *G06F 3/0679* (2013.01); *G06F 12/0607* (2013.01); *G06F 13/1642* (2013.01); *G06F 13/1673* (2013.01); *G06F 13/1694* (2013.01)

(58) Field of Classification Search
   CPC ............. G06F 13/1647; G06F 13/1642; G06F 13/1673; G06F 13/1694; G06F 3/061; G06F 3/0659; G06F 3/0679; G06F 12/0607
   See application file for complete search history.

(56) References Cited

U.S. PATENT DOCUMENTS

| | | | | |
|---|---|---|---|---|
| 6,076,139 A | * | 6/2000 | Welker | G06F 12/0292 711/104 |
| 6,098,149 A | * | 8/2000 | Ofer | G06F 3/061 710/39 |
| 6,170,035 B1 | * | 1/2001 | Gianellini | G06F 13/1647 711/105 |
| 6,272,594 B1 | * | 8/2001 | Gupta | G06F 12/1045 711/127 |
| 6,564,302 B1 | * | 5/2003 | Yagi | G06F 12/0817 711/122 |
| 6,697,888 B1 | * | 2/2004 | Halbert | G06F 13/4234 710/301 |
| 8,656,255 B1 | * | 2/2014 | Nemazie | G06F 11/1008 365/133 |
| 2003/0038810 A1 | * | 2/2003 | Emberling | G06T 1/60 345/540 |

(Continued)

OTHER PUBLICATIONS

Strass, Hermann, "An Introduction to NVMe", Seagate (Year: 2016).*

(Continued)

*Primary Examiner* — Ramon A. Mercado
(74) *Attorney, Agent, or Firm* — Vierra Magen Marcus LLP

(57) ABSTRACT

An example of a system includes a host interface, a set of non-volatile memory cells, and one or more control circuits coupled to the host interface and coupled to the set of non-volatile memory cells. The one or more control circuits are configured to access a host memory through the host interface by sending host memory access requests for two or more blocks of host data according to an interleaving scheme.

20 Claims, 15 Drawing Sheets

(56) References Cited

U.S. PATENT DOCUMENTS

| | | | | |
|---|---|---|---|---|
| 2004/0240302 | A1* | 12/2004 | Park | G11C 7/1042 365/230.06 |
| 2006/0155920 | A1* | 7/2006 | Smith | G06F 3/0616 711/103 |
| 2007/0005913 | A1* | 1/2007 | Muthrasanallur | G06F 13/1668 711/157 |
| 2012/0054455 | A1* | 3/2012 | Wang | G06F 12/0607 711/157 |
| 2012/0102293 | A1* | 4/2012 | Negishi | G06F 13/1626 711/200 |
| 2015/0081956 | A1* | 3/2015 | Vucinic | G06F 5/10 711/103 |
| 2016/0291985 | A1* | 10/2016 | Jenkins | G06F 3/0619 |
| 2017/0060422 | A1* | 3/2017 | Sharifie | G06F 3/061 |
| 2017/0060749 | A1* | 3/2017 | Segev | G06F 12/0862 |
| 2017/0123655 | A1* | 5/2017 | Sinclair | G06F 3/0611 |
| 2017/0168716 | A1* | 6/2017 | Shaharabany | G11C 29/52 |
| 2017/0262228 | A1* | 9/2017 | Kanno | G06F 3/0604 |
| 2018/0173649 | A1* | 6/2018 | Kyrychynskyi | G06F 13/161 |
| 2018/0175886 | A1* | 6/2018 | Myung | H03M 13/116 |
| 2018/0314629 | A1* | 11/2018 | Chen | G11C 16/32 |
| 2019/0042408 | A1* | 2/2019 | Schmisseur | G06F 3/067 |

OTHER PUBLICATIONS

Strass, Hermann, "An Introduction to NVMe", Seagate, 2016, 8 pages.

NVM Express Revision 1.3, May 1, 2017, 282 pages.

Huffman, Amber, "NVM Express: Optimized Interface for PCI Express* SSDs", IDF13, 2013, 58 pages.

SanDisk, "Native Command Queuing (NCQ) defined", https://kb.sandisk.com/app/answers/detail/a_id/8146/~/native-command-...1, Sep. 14, 2017, 2 pages.

NVM Express, Introduction Overview, 5 pages.

SNIA, PCI3 SSD 101, "An Overview of Standards, Markets and Performance", 2013, 32 pages.

* cited by examiner

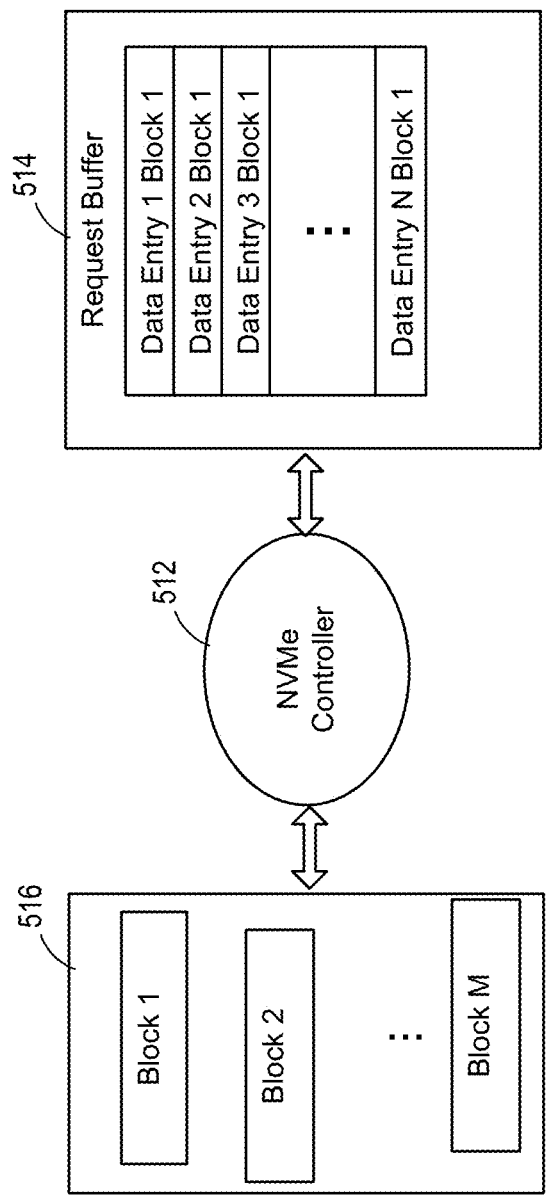

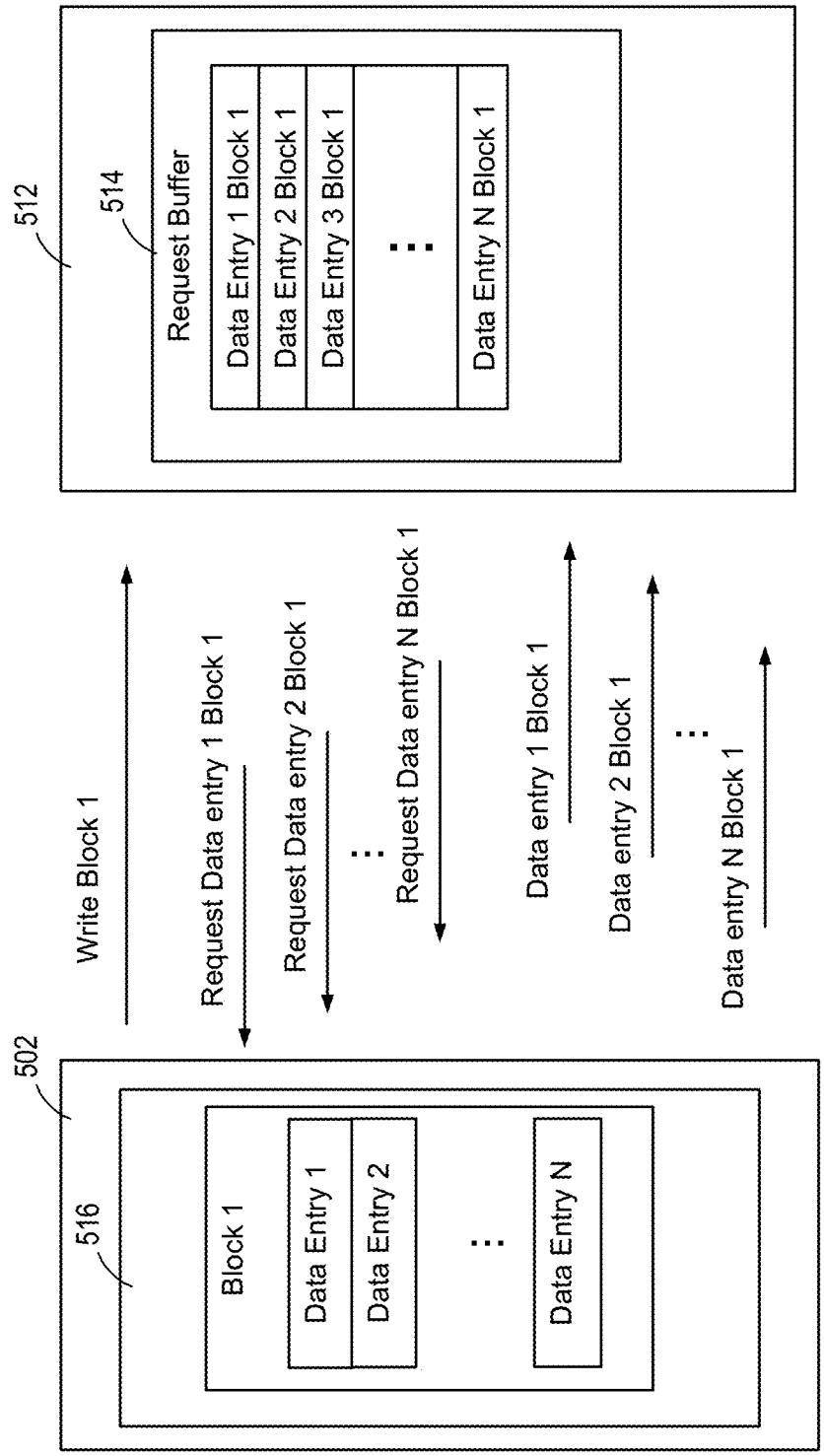

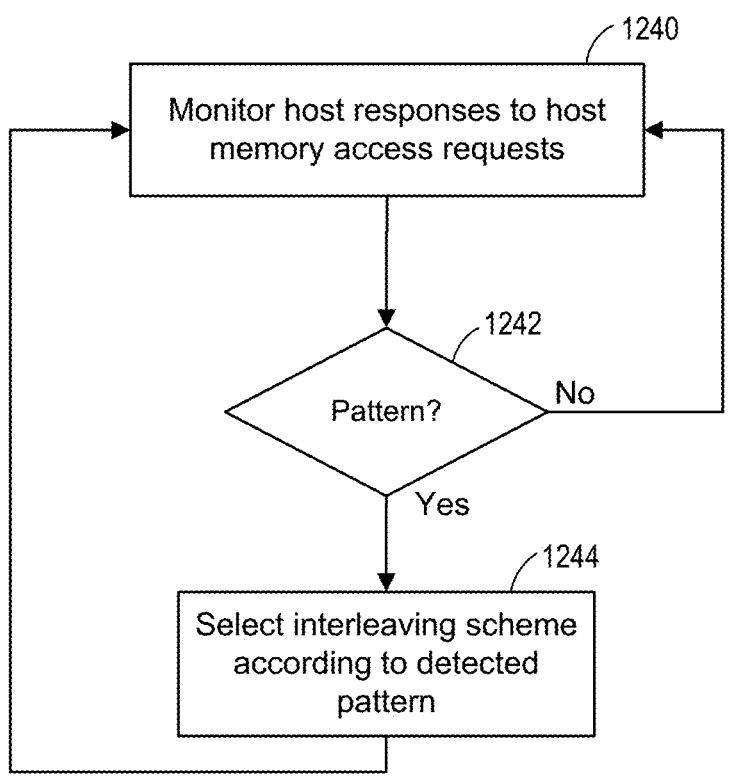

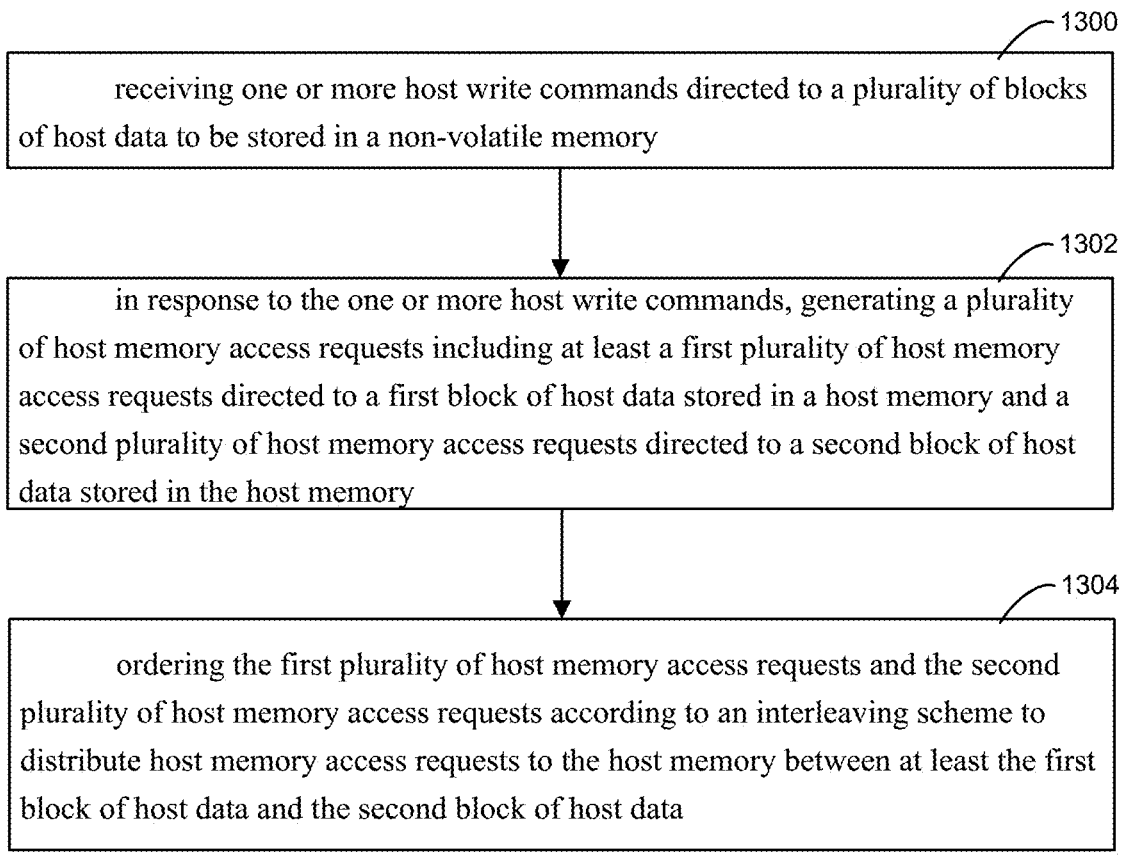

US 10,579,548 B2

ADAPTIVE INTERLEAVING OF DATA TRANSFER REQUESTS

BACKGROUND

Semiconductor memory is widely used in various electronic devices such as cellular telephones, digital cameras, personal digital assistants, medical electronics, mobile computing devices, and non-mobile computing devices. Semiconductor memory may comprise non-volatile memory or volatile memory. A non-volatile memory allows information to be stored and retained even when the non-volatile memory is not connected to a source of power (e.g., a battery). Examples of non-volatile memory include flash memory (e.g., NAND-type and NOR-type flash memory) and Electrically Erasable Programmable Read-Only Memory (EEPROM).

A data storage device that includes semiconductor memory may be in communication with a host system through an interface. In some cases, more than one data storage device may be in communication with a host system through one or more interfaces. Various standardized interfaces may be used for communication between components including data storage devices and a host system, including Peripheral Component Interface (PCI), PCI express (PCIe), Serial ATA (SATA), Serial Attached SCSI (SAS), Non-Volatile Memory Host Controller Interface Specification (NVMHCIS) or Non-Volatile Memory Express (NVMe), and other interfaces.

A data storage device may include one or more control circuits that facilitate operation of semiconductor memory. For example, a data storage device may include a memory controller that executes code (e.g. firmware) to carry out operations directed to a non-volatile memory (e.g. access operations such as read and write operations). Such code may be loaded into a Random Access Memory (RAM) coupled to the memory controller for execution.

BRIEF DESCRIPTION OF THE DRAWINGS

Like-numbered elements refer to common components in the different figures.

FIG. 6 illustrates an example of operation of an NVMe controller.

FIG. 7 illustrates an example of host memory read requests in response to a write command.

FIGS. 12A-D illustrate methods of operation.

FIG. 13 illustrates an example of a method that includes ordering access requests.

DETAILED DESCRIPTION

In examples of the present technology, an interface between a host system and a data storage system uses a request buffer that holds requests pending completion of the requests by a host. For example, requests for data from a host memory (e.g. host DRAM) may be held in a request buffer of an interface (e.g. NVMe request buffer of an NVMe interface) until requested are fulfilled by a host (e.g. until a host returns the requested data). In some cases, a request buffer may become filled with requests that are not completed rapidly for some reason. For example, where all requests in a request buffer are directed to the same block of host data, a problem accessing the block of host data may cause all requests in the request buffer to be delayed. Because the request buffer is occupied in such a situation, no other requests can be sent to the host and the data storage system waits until at least one request can be completed, which may cause significant delay. While a request queue may be enlarged to improve the chances that some request can be completed and thus keep requests flowing, this increases cost and complexity and may not be a desirable solution.

According to examples of the present technology a request queue may managed so that requests for portions of data of two or more blocks of host data are sent in an interleaved order and thus the corresponding request queue contains entries for the two or more blocks of host data. Thus, if requests for portions of a first block of host data are not rapidly completed, there are requests for portions of at least a second block of host data that may be completed to allow the interface to continue to operate. The interleaving scheme used may be selected from various interleaving schemes established by different metrics (e.g. interleaving fixed numbers of requests for different blocks of host data, setting a maximum number of host memory access requests per block of host data that may be unfulfilled, e.g. maximum number of host memory access requests per block of host data that may be in request buffer, setting a maximum number of blocks whose requests may be held in a request queue, or other interleaving scheme). In some cases, a host may send indicators of host memory characteristics (e.g. page size, number of banks, cache status, etc.) and an interleaving scheme may be chosen according to the indicators. In some cases, a pattern of host responses to host memory access requests may be identified and an interleaving scheme may be selected according to the pattern.

Figure 1:
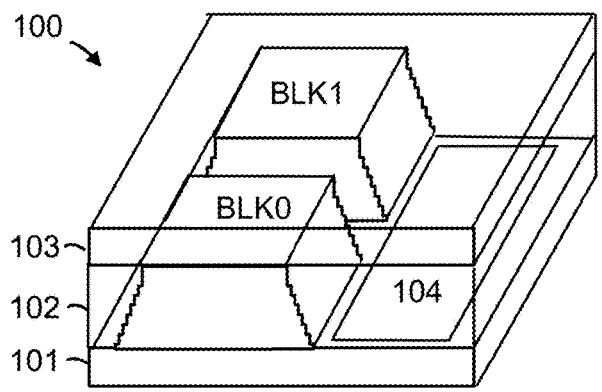
FIG. 1 is a perspective view of a 3D stacked non-volatile memory device.

FIGS. 1-4 describe one example of a memory system that can be used to implement aspects of the technology proposed herein. FIG. 1 is a perspective view of a three-dimensional (3D) stacked non-volatile memory device. The memory device 100 includes a substrate 101. On and above the substrate are example blocks of memory cells, including BLK0 and BLK1, formed of memory cells (non-volatile storage elements). Also, on substrate 101 is peripheral area 104 with support circuits for use by the blocks. Substrate 101 can also carry circuits under the blocks, along with one or more lower metal layers which are patterned in conductive paths to carry signals of the circuits. The blocks are formed in an intermediate region 102 of the memory device. In an upper region 103 of the memory device, one or more upper metal layers are patterned in conductive paths to carry signals of the circuits. Each block of memory cells comprises a stacked area of memory cells, where alternating levels of the stack represent word lines. While two blocks are depicted as an example, additional blocks can be used, extending in the x- and/or y-directions.

In one example implementation, the length of the plane in the x-direction, represents a direction in which signal paths for word lines extend (a word line or SGD line direction), and the width of the plane in the y-direction, represents a direction in which signal paths for bit lines extend (a bit line direction). The z-direction represents a height of the memory device.

Figure 2:
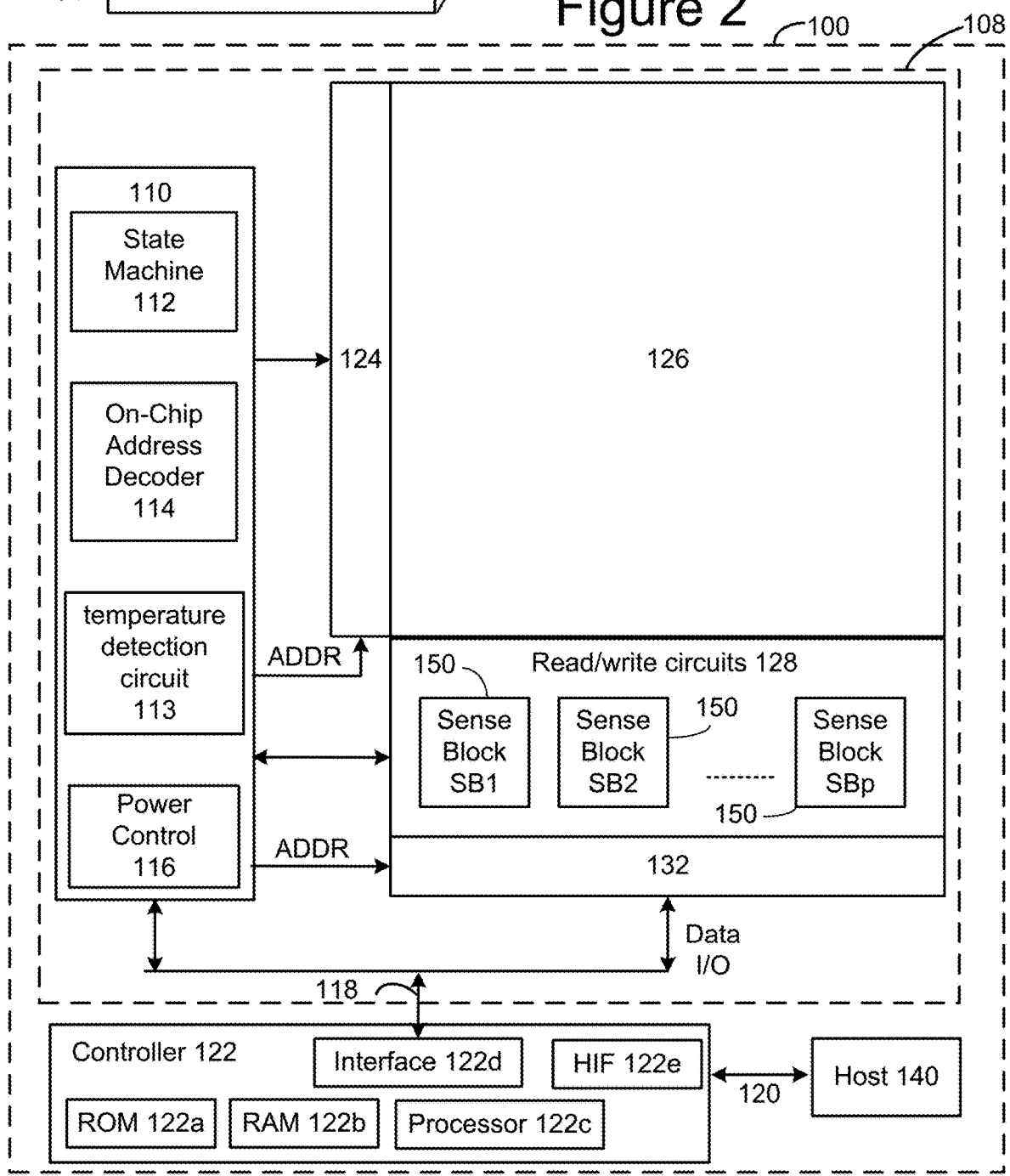
FIG. 2 is a functional block diagram of a memory device such as the 3D stacked non-volatile memory device 100 of FIG. 1.

FIG. 2 is a functional block diagram of an example memory device such as the 3D stacked non-volatile memory device 100 of FIG. 1. The components depicted in FIG. 2 are electrical circuits. Memory device 100 includes one or more memory die 108. Each memory die 108 includes a three-dimensional memory structure 126 of memory cells (such as, for example, a 3D array of memory cells), control circuitry 110, and read/write circuits 128. In other embodiments, a two-dimensional array of memory cells can be used. Memory structure 126 is addressable by word lines via a decoder 124 (row decoder) and by bit lines via a column decoder 132. The read/write circuits 128 include multiple sense blocks 150 including SB1, SB2, . . . , SBp (sensing circuitry) and allow a page of memory cells to be read or programmed in parallel. In some systems, a Controller 122 is included in the same memory device, such as memory device 100 (e.g., a removable storage card) as the one or more memory die 108. However, in other systems, the Controller can be separated from the memory die 108. In some embodiments, the Controller will be on a different die than the memory die. In some embodiments, one Controller 122 will communicate with multiple memory die 108. In other embodiments, each memory die 108 has its own Controller. Commands and data are transferred between the host 140 and Controller 122 via a data bus 120, and between Controller 122 and the one or more memory die 108 via lines 118. In one embodiment, memory die 108 includes a set of input and/or output (I/O) pins that connect to lines 118.

Memory structure 126 may comprise one or more arrays of memory cells including a 3D array. The memory structure may comprise a monolithic three-dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Control circuitry 110 cooperates with the read/write circuits 128 to perform memory operations (e.g., erase, program, read, and others) on memory structure 126, and includes a state machine 112, an on-chip address decoder 114, and a power control module 116. The state machine 112 provides chip-level control of memory operations. Temperature detection circuit 113 is configured to detect temperature, and can be any suitable temperature detection circuit known in the art. In one embodiment, state machine 112 is programmable by the software. In other embodiments, state machine 112 does not use software and is completely implemented in hardware (e.g., electrical circuits). In one embodiment, control circuitry 110 includes registers, ROM fuses and other storage devices for storing default values such as base voltages and other parameters.

The on-chip address decoder 114 provides an address interface between addresses used by host 140 or Controller 122 to the hardware address used by the decoders 124 and 132. Power control module 116 controls the power and voltages supplied to the word lines and bit lines during memory operations. It can include drivers for word line layers (discussed below) in a 3D configuration, select transistors (e.g., SGS and SGD transistors, described below) and source lines. Power control module 116 may include charge pumps for creating voltages. The sense blocks include bit line drivers. An SGS transistor is a select gate transistor at a source end of a NAND string, and an SGD transistor is a select gate transistor at a drain end of a NAND string.

Any one or any combination of control circuitry 110, state machine 112, decoders 114/124/132, temperature detection circuit 113, power control module 116, sense blocks 150, read/write circuits 128, and Controller 122 can be considered a circuit or circuits (or a managing circuit) that performs the functions described herein.

Controller 122 (which in one embodiment is an electrical circuit that may be on-chip or off-chip) may comprise one or more processors 122c, ROM 122a, RAM 122b, Memory interface 122d and Host Interface 122e, all of which are interconnected. One or more processors 122C is one example of a control circuit. Other embodiments can use state machines or other custom circuits designed to perform one or more functions. The storage devices (including ROM 122a, RAM 122b) comprises code such as a set of instructions, and the processor 122c is operable to execute the set of instructions to provide the functionality described herein. Alternatively, or additionally, processor 122c can access code from a storage device in the memory structure, such as a reserved area of memory cells connected to one or more word lines. Memory interface 122d, in communication with ROM 122a, RAM 122b and processor 122c, is an electrical circuit that provides an electrical interface between Controller 122 and memory die 108. For example, memory interface 122d can change the format or timing of signals, provide a buffer, isolate from surges, latch I/O, etc. Processor 122C can issue commands to control circuitry 110 (or any other component of memory die 108) via Memory interface 122d. Host Interface 122e in communication with ROM 122a, RAM 122b and processor 122c, is an electrical circuit that provides an electrical interface between Controller 122 and host 140. For example, Host Interface 122e can change the format or timing of signals, provide a buffer, isolate from surges, latch I/O, etc. Commands and data from host 140 are received by Controller 122 via Host Interface 122e. Data sent to host 140 are transmitted via Host Interface 122e.

Multiple memory elements in memory structure 126 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors.

A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

A three-dimensional memory array is arranged so that memory cells occupy multiple planes or multiple memory device levels, thereby forming a structure in three dimensions (i.e., in the x, y and z directions, where the z direction is substantially perpendicular, and the x and y directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in they direction) with each column having multiple memory cells. The vertical columns may be arranged in a two-dimensional configuration, e.g., in an x-y plane, resulting in a three-dimensional arrangement of memory cells, with memory cells on multiple vertically stacked memory planes. Other configurations of memory elements in three dimensions can also constitute a three-dimensional memory array.

By way of non-limiting example, in a three-dimensional NAND memory array, the memory elements may be coupled together to form vertical NAND strings that traverse across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

A person of ordinary skill in the art will recognize that the technology described herein is not limited to a single specific memory structure, but covers many relevant memory structures within the spirit and scope of the technology as described herein and as understood by one of ordinary skill in the art.

Figure 3:
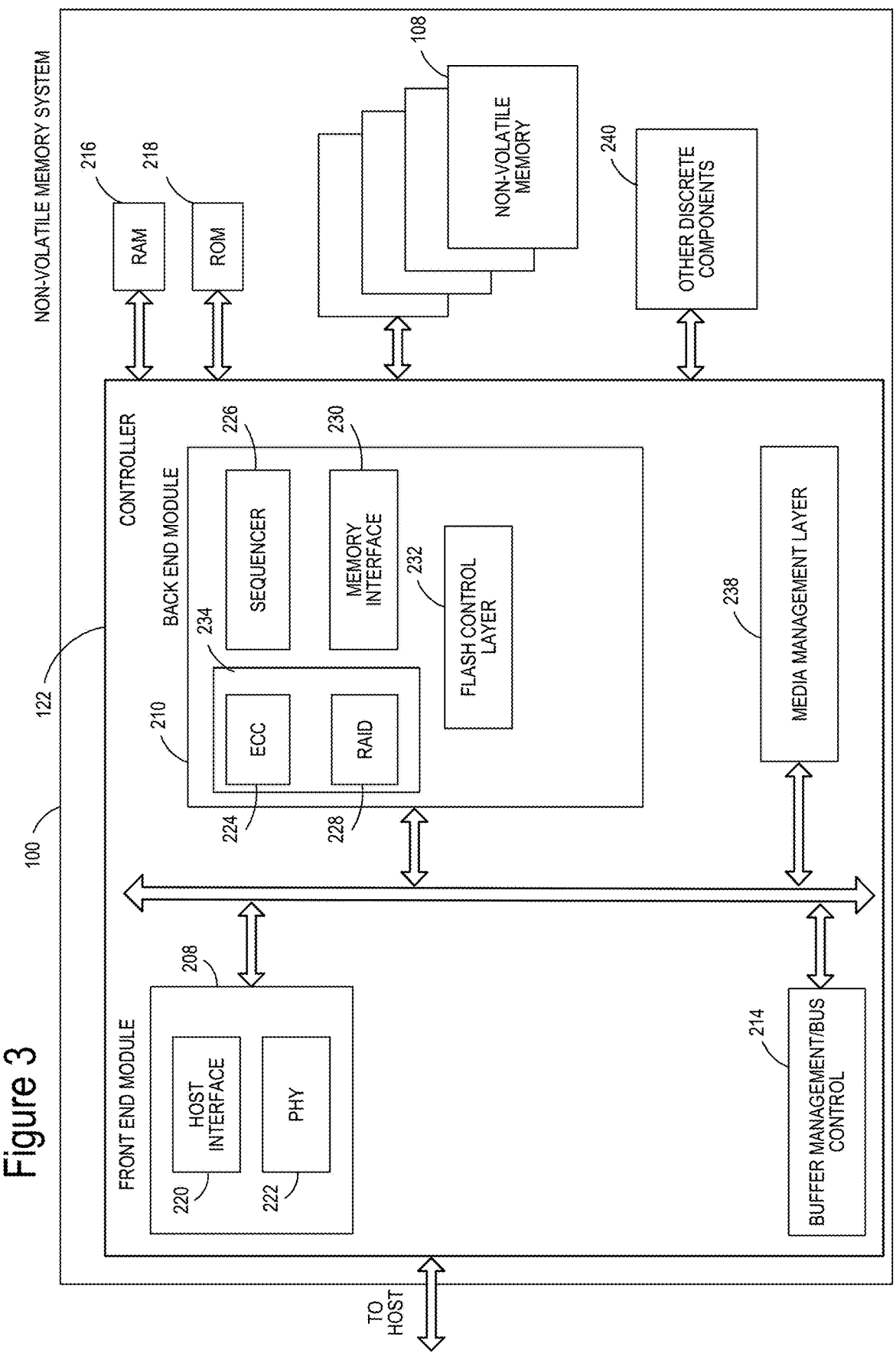
FIG. 3 is a block diagram depicting one embodiment of a Controller.

FIG. 3 is a block diagram of memory system 100, depicting more details of Controller 122. In one embodiment, the system of FIG. 3 is a solid-state drive (SSD). As used herein, a flash memory Controller is a device that manages data stored on flash memory and communicates with a host, such as a computer or electronic device. A flash memory Controller can have various functionality in addition to the specific functionality described herein. For example, the flash memory Controller can format the flash memory to ensure the memory is operating properly, map out bad flash memory cells, and allocate spare memory cells to be substituted for future failed memory cells. Some part of the spare memory cells can be used to hold firmware to operate the flash memory Controller and implement other features. In operation, when a host needs to read data from or write data to the flash memory, it will communicate with the flash memory Controller. If the host provides a logical address to which data is to be read/written, the flash memory Controller can convert the logical address received from the host to a physical address in the flash memory. (Alternatively, the host can provide the physical address). The flash memory Controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The communication interface between Controller 122 and non-volatile memory die 108 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system. For example, the flash memory may be embedded within the host, such as in the form of a solid-state disk (SSD) drive installed in a personal computer.

In some embodiments, memory system 100 includes a single channel between Controller 122 and non-volatile memory die 108, the subject matter described herein is not limited to having a single memory channel. For example, in some memory system architectures, 2, 4, 8 or more channels may exist between the Controller and the memory die, depending on Controller capabilities. In any of the embodiments described herein, more than a single channel may exist between the Controller and the memory die, even if a single channel is shown in the drawings.

As depicted in FIG. 3, Controller 122 includes a front-end module 208 that interfaces with a host, a back-end module 210 that interfaces with the one or more non-volatile memory die 108, and various other modules that perform functions which will now be described in detail.

The components of Controller 122 depicted in FIG. 3 may take the form of a packaged functional hardware unit (e.g., an electrical circuit) designed for use with other components, a portion of a program code (e.g., software or firmware) executable by a (micro)processor or processing circuitry (or one or more processors) that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively, or in addition, each module may include or comprise software stored in a processor readable device (e.g., memory) to program one or more processors for Controller 122 to perform the functions described herein. The architecture depicted in FIG. 3 is one example implementation that may (or may not) use the components of Controller 122 depicted in FIG. 2 (i.e. RAM, ROM, processor, interface).

Referring again to modules of the Controller 122, a buffer manager/bus Controller 214 manages buffers in random access memory (RAM) 216 and controls the internal bus arbitration of Controller 122. A read only memory (ROM) 218 stores system boot code. Although illustrated in FIG. 3 as located separately from the Controller 122, in other embodiments one or both of the RAM 216 and ROM 218 may be located within the Controller. In yet other embodiments, portions of RAM and ROM may be located both within the Controller 122 and outside the Controller. Further, in some implementations, the Controller 122, RAM 216, and ROM 218 may be located on separate semiconductor die.

Front-end module 208 includes a host interface 220 and a physical layer interface 222 (PHY) that provide the electrical interface with the host or next level storage Controller. The choice of the type of host interface 220 can depend on the type of memory being used. Examples of host interfaces 220 include, but are not limited to, SATA, SATA Express, SAS, Fibre Channel, USB, PCIe, and NVMe. The host interface 220 may be a communication interface that facilitates transfer for data, control signals, and timing signals.

Back-end module 210 includes an error correction Controller (ECC) engine, ECC engine 224, that encodes the data bytes received from the host, and decodes and error corrects the data bytes read from the non-volatile memory. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the memory system 100. In some cases, the RAID module 228 may be a part of the ECC engine 224. Note that the RAID parity may be added as an extra die or dies as implied by the common name, but it may also be added within the existing die, e.g. as an extra plane, or extra block, or extra WLs within a block. ECC engine 224 and RAID module 228 both calculate redundant data that can be used to recover when errors occur and may be considered examples of redundancy encoders. Together, ECC engine 224 and RAID module 228 may be considered to form a combined redundancy encoder 234. A memory interface 230 provides the command sequences to non-volatile memory die 108 and receives status information from non-volatile memory die 108. In one embodiment, memory interface 230 may be a double data rate (DDR) interface, such as a Toggle Mode 200, 400, or 800 interface. A flash control layer 232 controls the overall operation of back-end module 210.

Additional components of memory system 100 illustrated in FIG. 3 include media management layer 238, which performs wear leveling of memory cells of non-volatile memory die 108. Memory system 100 also includes other discrete components 240, such as external electrical interfaces, external RAM, resistors, capacitors, or other components that may interface with Controller 122. In alternative embodiments, one or more of the physical layer interface 222, RAID module 228, media management layer 238 and buffer management/bus Controller 214 are optional components that are not necessary in the Controller 122.

The Flash Translation Layer (FTL) or Media Management Layer (MML) 238 may be integrated as part of the flash management that may handle flash errors and interfacing with the host. In particular, MML may be a module in flash management and may be responsible for the internals of NAND management. In particular, the MML 238 may include an algorithm in the memory device firmware which translates writes from the host into writes to the flash memory structure 126 of memory die 108. The MML 238 may be needed because: 1) the flash memory may have limited endurance; 2) the flash memory structure 126 may only be written in multiples of pages; and/or 3) the flash memory structure 126 may not be written unless it is erased as a block (i.e. a block may be considered to be a minimum unit of erase and such a non-volatile memory may be considered a block-erasable non-volatile memory). The MML 238 understands these potential limitations of the flash memory structure 126 which may not be visible to the host. Accordingly, the MML 238 attempts to translate the writes from host into writes into the flash memory structure 126.

Controller 122 may interface with one or more memory die 108. In one embodiment, Controller 122 and multiple memory dies (together comprising memory system 100) implement a solid-state drive (SSD), which can emulate, replace or be used instead of a hard disk drive inside a host, as a NAS device, etc. Additionally, the SSD need not be made to work as a hard drive.

Figure 4:
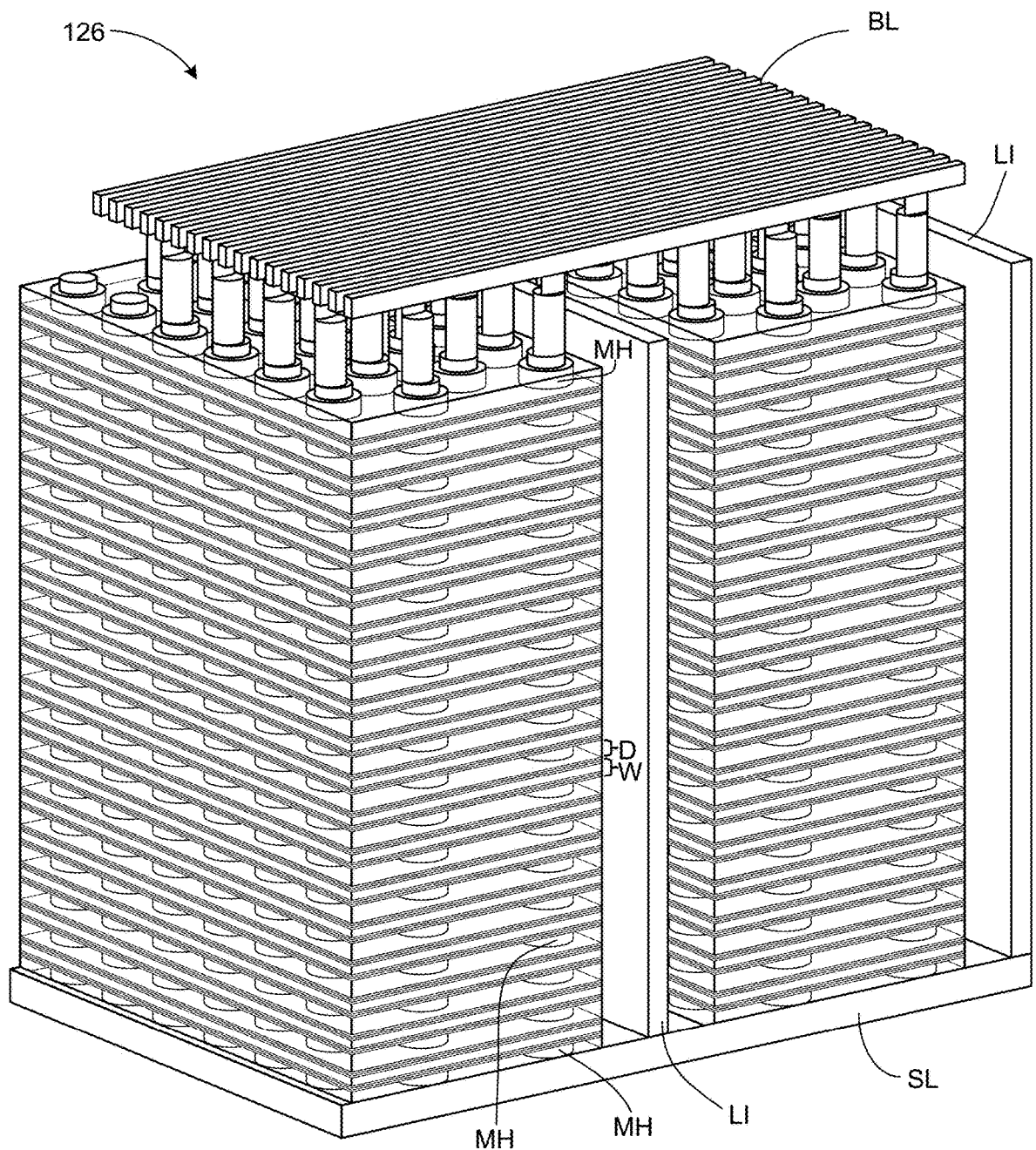
FIG. 4 is a perspective view of a portion of one embodiment of a three-dimensional monolithic memory structure.

FIG. 4 is a perspective view of a portion of a three-dimensional memory structure 126, which includes a plurality memory cells. For example, FIG. 4 shows a portion of one block of memory. The structure depicted includes a set of bit lines BL positioned above a stack of alternating dielectric layers and conductive layers. For example, for illustration purposes, one of the dielectric layers is marked as D and one of the conductive layers (also called word line layers) is marked as W. The number of alternating dielectric layers and conductive layers can vary based on specific implementation requirements. One set of embodiments includes between 108-216 alternating dielectric layers and conductive layers, for example, 96 data word line layers, 8 select layers, 4 dummy word line layers and 108 dielectric layers. More or less than 108-216 layers can also be used. As will be explained below, the alternating dielectric layers and conductive layers are divided into four "fingers" by local interconnects LI. FIG. 4 only shows two fingers and two local interconnects LI. Below and the alternating dielectric layers and word line layers is a source line layer SL. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping layer to create a vertical column of memory cells. Each memory cell can store one or more bits of data.

One example of a ReRAM memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. This configuration is known as a spin valve and is the simplest structure for an MRAM bit. A memory device is built from a grid of such memory cells. In one embodiment for programming a non-volatile storage system, each memory cell lies between a pair of write lines arranged at right angles to each other, parallel to the memory cell, one above and one below the memory cell. When current is passed through them, an induced magnetic field is created.

Phase change memory (PCRAM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse but includes a (continuous or non-continuous) vibration or burst of sound, current, voltage light, or other wave.

In some data storage devices, efficient use of an interface between a host and data storage device that includes non-volatile memory may be important. Various interfaces may operate in different ways that may provide different levels of efficiency. Aspects of the present technology are directed to ensuring efficient operation of an interface between a host and a data storage device, for example, ensuring that certain events do not cause an interface to stall while waiting for a host to complete requests. While some examples described below refer to particular interfaces, it will be understood that aspects of the present technology are not limited to a particular interface, or to any particular configuration.

An example of such an interface standard is the NVM Express (NVMe) or Non-Volatile Memory Host Controller Interface Specification (NVMHCIS). NVMe is a protocol adapted for accessing data storage devices attached via a PCI or PCI Express (PCIe) bus and has some advantages over other protocols such as SCSI, SAS, or SATA, that were developed for Hard Disk Drives (HDDs). NVMe is generally defined by specifications generated by industry participants, for example, NVM Express Revision 1.3, published on May 1, 2017. A PCIe physical interface that is configured to operate according to the NVMe protocol (e.g. using an NVMe controller) may be considered an NVMe interface.

Figure 5:
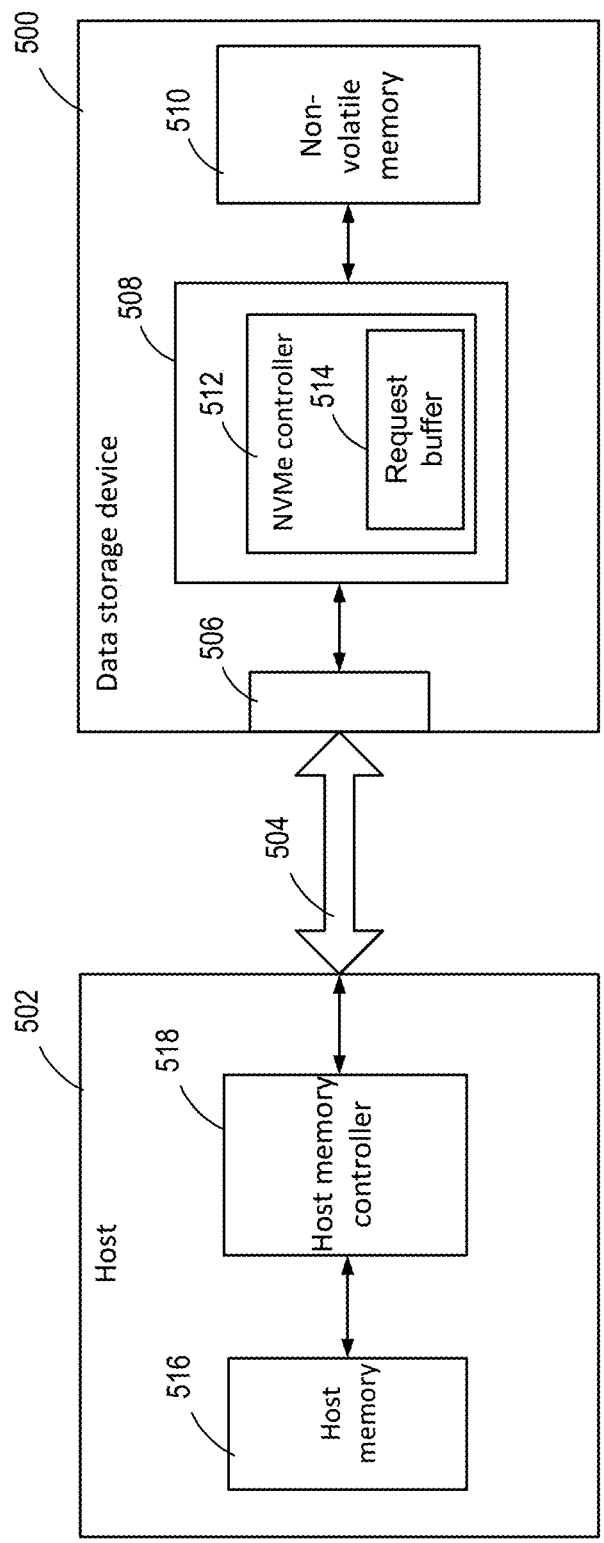
FIG. 5 illustrates an example of a data storage device with an NVMe controller.

FIG. 5 shows an example of a data storage device 500 connected to a host 502 through an interface 504. For example, interface 504 may be an NVMe interface (i.e. a PCIe interface that is operated by an NVMe controller in accordance with the NVMe protocol). Data storage device 500 includes interface circuits 506 (e.g. physical interface) connected to control circuits 508 (e.g. controller 122 of FIG. 3), which are connected to non-volatile memory 510 (e.g. non-volatile memory 108 of FIG. 3, which may include a set of non-volatile memory cells located in one or more non-volatile memory dies and may include a 3-D memory structure such as three-dimensional non-volatile memory structure 126). Control circuits 508 include NVMe controller 512 and request buffer 514 (which is shown as part of NVMe controller 512 in this example but may be a separate component in some cases). Other components of control circuits 508 (e.g. components shown in controller 122 of FIG. 3 and/or other components) are omitted from FIG. 5 for clarity.

Host 502 includes a host memory 516, which may be a Dynamic RAM (DRAM) or other volatile or non-volatile memory and a host memory controller 518, which may be a DRAM controller or other such memory controller that manages host memory 516. Interactions between a data storage device and a host may use a host memory such as host memory 516, e.g. as provided by an interface standard such as the NVMe standard. For example, when the host sends a host write command, control circuits (e.g. NVMe controller 512) may then access the data to be written by requesting it from host memory (e.g. from host memory 516) and may subsequently transfer it to nonvolatile memory (e.g. non-volatile memory 510) to be written. In some cases, such transfers may take significant time, e.g. because of other operations directed to host memory 516.

FIG. 6 illustrates an example of how NVMe controller 512 operates request buffer 514. In particular, request buffer 514 is shown containing host memory access requests directed to host memory 516. Host memory 516 includes blocks of host data (Block 1, Block 2 . . . Block M) that include data to be written in a non-volatile memory, and such blocks of host data may be distributed at various locations in host memory 516. Request buffer 514 contains host memory access requests accordingly. In an example of an NVMe interface, a host sends host write commands in minimum units (blocks of host data) consisting of four kilobytes (4 KB) of host data while an NVMe controller generates host memory access requests for portions of host data of one-hundred and twenty-eight Bytes (128 B) each (e.g. Data Entry 1 Block 1 of FIG. 6 corresponds to a request for the first 128 B in Block 1, Data Entry 2 Block 1 corresponds to a request for the second 128 B and so on through Data Entry N Block 1, which corresponds to a request for the Nth 128 B in Block 1). N may be the number of entries that can fit in request buffer 514, which may be thirty-two (32) to allow all requests for a block of host data to be buffered or may be some other number. The number N provides a limit to the number of host memory access requests that can be outstanding (unfulfilled) at a given time.

FIG. 7 illustrates an example of a write command directed to Block 1 ("Write Block 1") that is received by NVMe controller 512, which sends corresponding host memory access requests ("Request Data Entry 1 Block 1" to "Request Data Entry N Block 1") to host 502 and adds corresponding requests to request buffer 514 ("Data Entry 1 Block 1" to "Data Entry N Block 1" in request buffer 514). When host 502 receives host memory access requests it accesses the corresponding data in host memory 516, i.e. it accesses Data Entry 1 to Data Entry N of Block 1. Then, it returns this data to NVMe controller 512 ("Data Entry 1 Block 1" to "Data Entry N Block 1" sent from host 502 to NVMe controller 512). Host access requests are removed from request buffer 514 when corresponding data is received from host 502 so that new entries can be added, i.e. requests in request buffer 514 relate to uncompleted requests and are removed once requests are completed. While FIG. 7 shows data being returned in the order in which host memory access requests were sent, it will be understood that this is not always the case and that maintaining a request buffer allows out-of-order return of data by tracking which requests have been fulfilled and which have not. In some cases, a problem with one or more block, such as Block 1 stored in host memory 516 may cause a delay. For example, where host access requests relating to a single block of host data occupy a request buffer, such as request buffer 514, and a problem occurs with the corresponding block of host data in host memory, new host memory access requests and corresponding data transfers may be stopped. Because a block of host data may be stored as a unit at a location in host memory, requests relating to the same block of host data tend to encounter similar conditions and tend to be commonly affected by some delays (e.g. collision with other access to the same or nearby locations in host memory). While request buffer 514 is shown as a component of NVMe controller 512 in FIG. 7, such a request buffer may also be considered as a separate component and the physical arrangement of NVMe controller circuits and request buffer circuits is not limited to any particular arrangement.

Figure 8A:
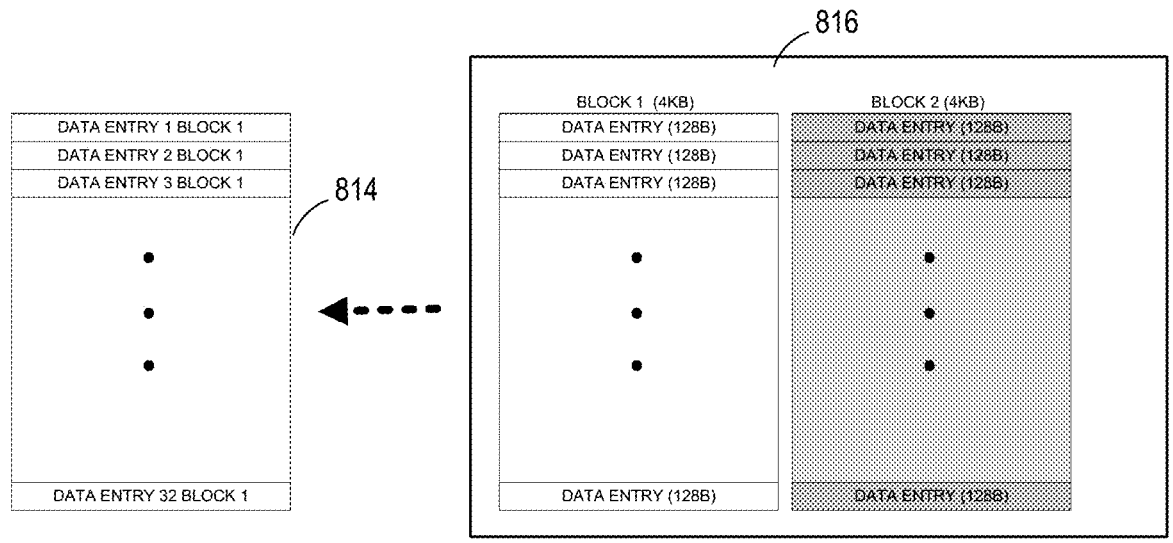
FIGS. 8A-B illustrate operation of a request buffer.
Figure 8B:
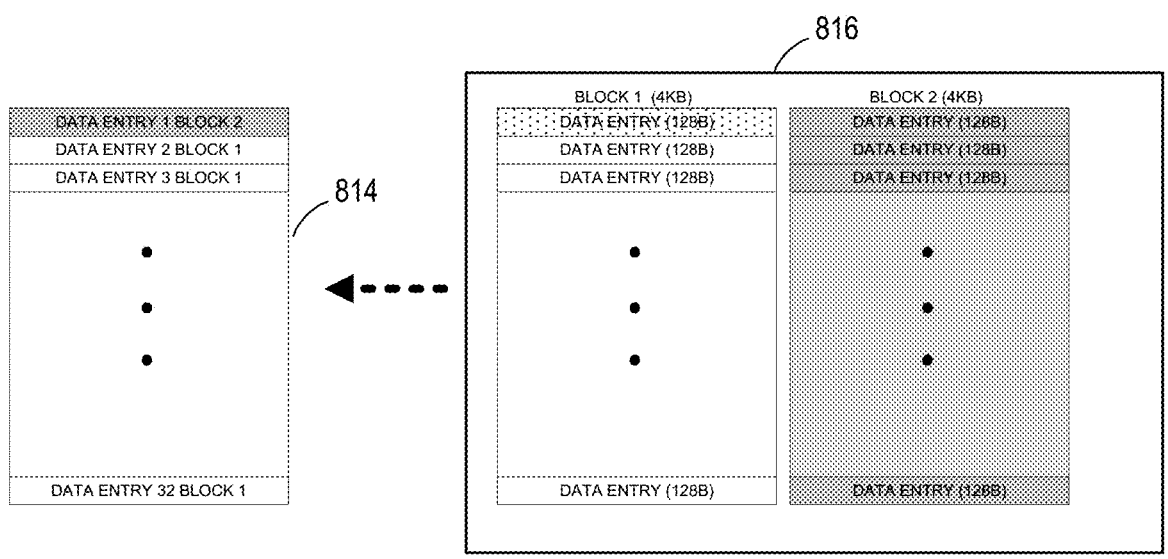

FIGS. 8A-B illustrate an example of a request buffer 814 that has capacity to store host memory access requests for one block of host data (in this example, capacity to store 32 entries). Host memory 816 includes two blocks, Block 1 and Block 2, each containing 4 KB of data corresponding to 32 host access requests of 128 B each. FIG. 8A shows the situation where all host memory access requests corresponding to Block 1 are in request buffer 814 so that no other entries can be added to request buffer 814. Subsequently, as shown in FIG. 8B the first host memory access request of Block 1 (Data Entry 1 Block 1) is completed (i.e. data is returned) and the corresponding entry is removed from request buffer 814 thereby allowing the addition of an entry corresponding to Block 2 (Data Entry 1 Block 2) and thus allowing the corresponding request to be sent to the host. Until at least one host memory access request relating to Block 1 is completed, no host memory access request relating to Block 2 could be added to request buffer 814 or sent to the host. Thus, a problem related to Block 1 could cause an interface to become stuck at the stage shown in FIG. 8A.

Figure 9A:
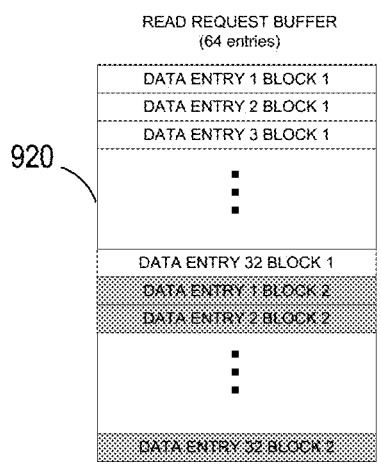
FIGS. 9A-B illustrate request buffers of different sizes.
Figure 9B:
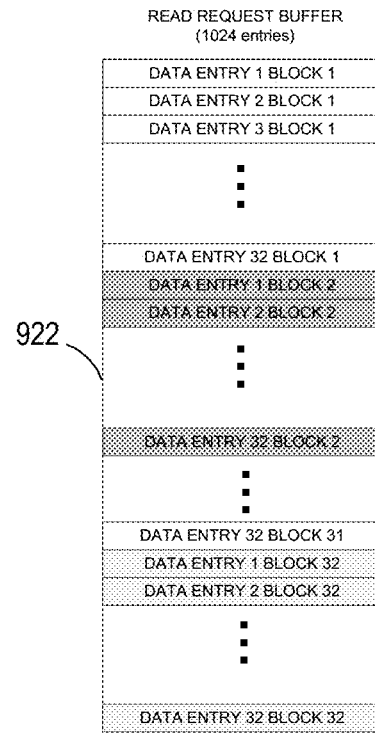

One way to avoid a request buffer becoming filled with host memory access requests relating to a block of host data (e.g. scenario of FIG. 8A) would be to simply make the request buffer bigger. For example, FIG. 9A shows an example of a request buffer 920 that has capacity for 64 entries (twice the capacity of request buffer 814) and thus allows all host memory access requests for two blocks of host data to be buffered at the same time (i.e. 32 entries for Block 1 and 32 entries for Block 2 as shown). This reduces the risk of delay. However, in some scenarios there may be problems with two such blocks so that delay may still occur. FIG. 9B shows an example of a request buffer 922 that has capacity to store 1024 entries corresponding to all host memory access requests for 32 blocks of host data. The risk of such a buffer being filled with delayed requests is reduced because the requests are spread out over 32 blocks of host data. However, such an increase in buffer size increases cost and complexity and may not be a desirable solution.

Figure 10A:
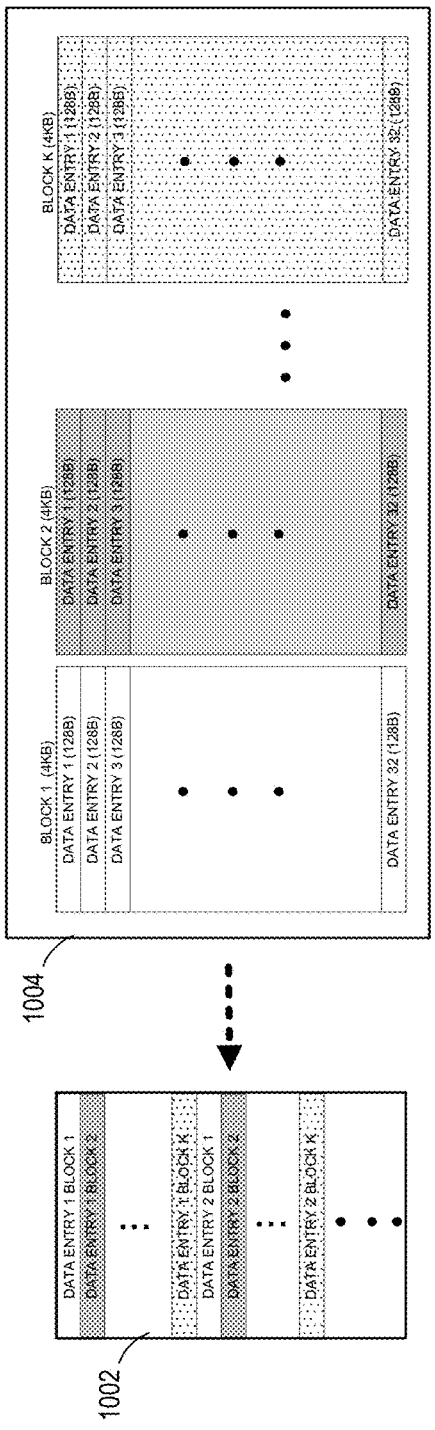
FIGS. 10A-B illustrate examples of interleaved requests for different blocks of host data.

According to an example of the present technology, host memory access requests for two or more blocks of host data may be sent to a host in an interleaved order so that corresponding entries in a request buffer include entries for two or more blocks, thereby reducing risk of delay due to problems relating to one block. FIG. 10A shows an example of a request buffer 1002 in a system that sends interleaved host memory access requests so that host memory access requests of multiple blocks in host memory 1004 (which may be generated from one or more host commands, e.g. host write commands) are in request buffer at the same time even where the capacity of the request buffer may be equal to or less than the number of requests per block of host data. FIG. 10A shows Block 1 to Block K in host memory 1004 and corresponding entries in request buffer 1002. In this example, host access requests are interleaved individually so that a request for Data Entry 1 Block 1 is followed by Data Entry 1 Block 2 and so on to Data Entry 1 Block K, then Data Entry 2 for Block 1 to Block K and so on. The number of data entries for each block of host data that may be maintained in request buffer 1002 depends on the size of request buffer 1002 and the number of blocks to be included in such an interleaved order, i.e. the value of K. For example, where request queue 1002 has capacity for 32 entries (equal to the number of requests per block of host data) and K is 8, then request buffer 1002 can hold four host access requests for each block. It will be understood that the interleaved requests shown in request buffer 1002 correspond to host memory access requests sent to a host and that the order of requests shown in request buffer 1002 reflects the order in which such requests are sent (i.e. requests are sent to host according to the interleaving scheme).

Figure 10B:
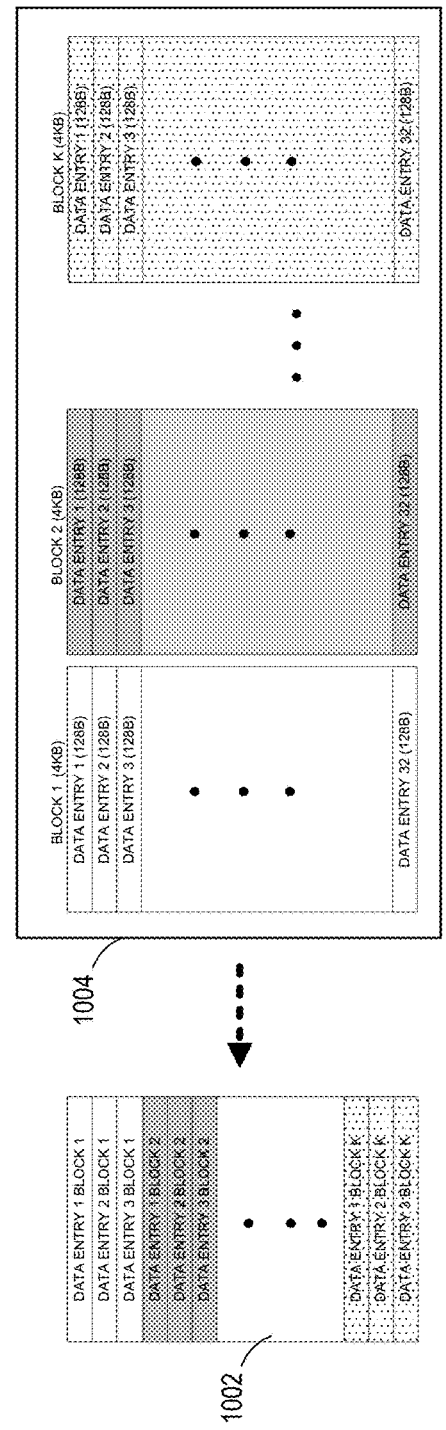

FIG. 10B shows another example in which host memory access requests are sent in an interleaved order according to an interleaving scheme that interleaves host memory access requests in units of three host memory access requests. Thus, host memory access requests for Data Entry 1 to Data Entry 3 of Block 1 are followed by Data Entry 1 to Data Entry 3 of Block 2 and then Data Entry 1 to Data Entry 3 of Block 3, and so on. While the unit of interleaving in this example is three host memory access requests (compared with the unit of an individual host memory access request shown in FIG. 10A) it will be understood that any suitable number of host memory access requests may be taken as the unit of interleaving. In addition, in some cases, the number of host memory access requests to interleave may not be fixed and an interleaving scheme may be based on how many blocks should have host access requests interleaved (e.g. what value of K in examples of FIGS. 10A-B) without specifying a particular unit of interleaving so that an interleaving scheme may be more randomized. In some cases, control circuits may apply different interleaving schemes at different times so that interleaving may be adaptive. The same memory may apply the interleaving scheme of FIG. 10A at one time and may apply the interleaving scheme of FIG. 10B at another time, e.g. to adapt to changing host behavior, in response to a command, or for some other reason. Host memory access requests may be reordered from a default order that would send all host memory access requests of a block in an unbroken sequence so that they are sent out-of-order, interleaved with host access requests of other blocks of host data. While the examples of FIGS. 10A-B show request buffer 1002 that has capacity to hold a number of requests that is equal to the number of requests per block of host data (32 in this example), this may not always be the case. In some cases, a request buffer may be larger or smaller. For example, using interleaving as described may allow use of a request buffer that holds a number of requests that is fewer than the number of requests per block of host data (i.e. less than 32 in this example).

Aspects of the present technology may be applied in various arrangements including arrangements with and without host caching. Where caching is not used, interleaving may avoid delays associated with slow response to requests directed to a particular block of host data (e.g. due to collisions or other issues). Where caching is used, interleaved host memory access requests for different blocks of host data may additionally allow some parallel operation, e.g. caching data of one block of host data while transferring data of another block of host data from host memory over an NVMe interface. Aspects of the present technology may be applied to sequential writes (where blocks of host data are written in sequence, e.g. order such as blocks 1, 2, 3 . . . ) and non-sequential (random) writes (e.g. where blocks of host data are written out of sequence, e.g. order such as blocks 5, 3, 11 . . . ). For random writes, host memory read requests corresponding to multiple write commands may be interleaved (e.g. host memory read requests corresponding to write commands directed to blocks 5, 2, 11 . . . ). For sequential writes, host memory read requests corresponding to multiple blocks of host data of the same command, or different commands, may be interleaved. In general, an interleaving scheme may be used to distribute host memory access requests (e.g. read requests) to the host memory between at least a first block of host data and a second block of host data so that all outstanding host memory access requests are not directed to a single block of host data.

Figure 11A:
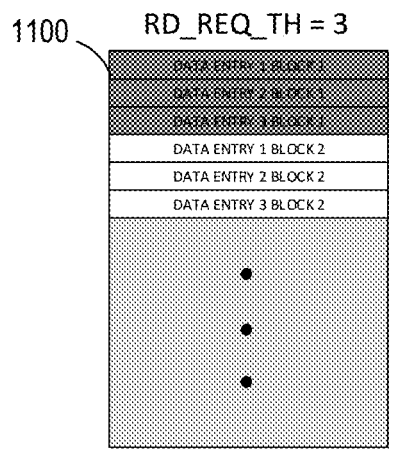
FIGS. 11A-B illustrate different interleaving schemes.
Figure 11B:
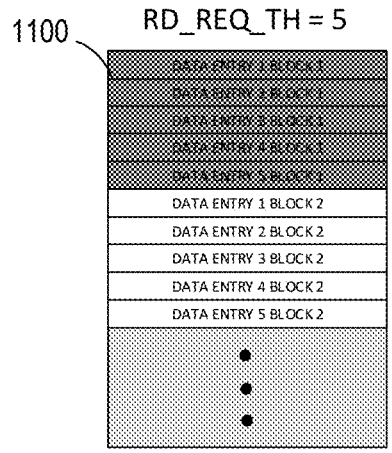

FIGS. 11A-B illustrate two interleaving schemes that are set by a read request threshold value (RD_REQ_TH) that is a variable set as a maximum number of requests from any one block that may be present in a request buffer 1100 at any time. In the case of FIG. 11A, this threshold is set to three (RD_REQ_TH=3) so that at most three host memory access requests for any given block may be in request buffer 1100 at any time. In the case of 11B, this threshold is set to five (RD_REQ_TH=5) so that at most five host memory access requests for any given block of host data may be in request buffer 1100 at any time. In general, the threshold number may be set to any value between one and the capacity of the request queue. Other metrics may also be set to establish an interleaving scheme. In selecting an interleaving scheme, there may be a tradeoff between complexity and risk, i.e. reducing risk of some delays may require additional complexity.

An interleaving scheme for sending host memory access requests to a host (and for storing such requests in a request buffer) may be selected according to various factors. For example, a host may provide control circuits (e.g. NVMe controller) with indicators of host memory characteristics and an interleaving scheme may be selected accordingly. For example, a host may indicate host memory characteristics including the memory page size (e.g. DRAM page size), number of banks, cache properties (e.g. is host memory caching enabled and/or properties of any cache). This may be done as part of an initialization routine when a data storage system is first connected to a host.

Figure 12A:
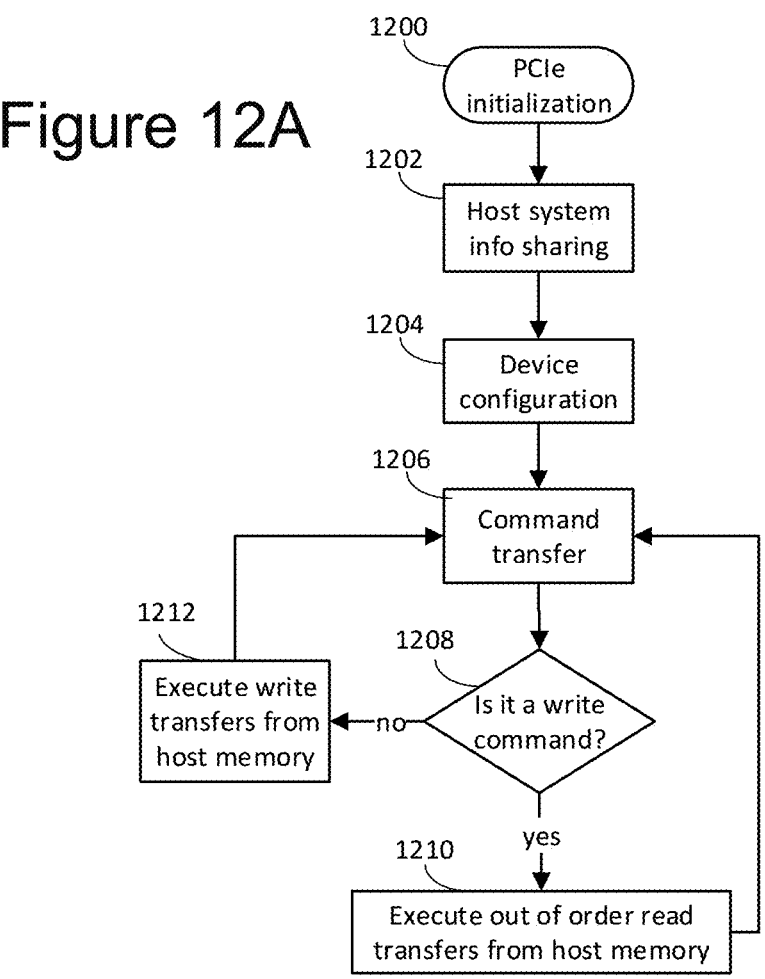

FIG. 12A illustrates an example of a method of operating a memory interface such as an NVMe interface. After PCIe initialization 1200 (e.g. initialization of basic interface features), if a host supports it, host system information sharing 1202 occurs to indicate to the NVMe controller one or more host memory characteristics, e.g. control circuits in a data storage system (e.g. control circuits 508 in data storage device 500) receive one or more indicators of host memory characteristics through the host interface. Subsequent device configuration 1204 may be based on host memory characteristics, e.g. an NVMe controller may determine an interleaved order according to the one or more indicators of host memory characteristics. Subsequently, in response to a command transfer 1206, a determination is made as to whether it is a write command 1208. If it is a write command 1208 then host memory access requests (i.e. read requests directed to data in host memory to be written in non-volatile memory) are subject to an interleaving scheme to execute out of order read transfers from host memory 1210. If it is not a write command 1208, i.e. it is a read command, then the host may execute write transfers from host memory 1212, i.e. transfers data from non-volatile memory and write it in host memory. Where a host does not support information sharing, a NVMe controller may still implement interleaving using a default scheme or otherwise.

In some cases, in addition to, or as an alternative to receiving one or more indicators of host memory characteristics from a host through the host interface, control circuits in a data storage system (e.g. control circuits 508 in data storage device 500) may configure a device and/or update configuration based on host memory characteristics that are found by observing host memory responses to host memory access requests. For example, control circuits are configured to detect one or more patterns of host memory responses to host memory access requests and to modify the interleaving scheme in response to a predetermined pattern of host memory responses. Thus, where delays are experienced when accessing particular blocks of host data, host memory access requests directed to those blocks may be interleaved with host memory access requests directed to other blocks that do not cause delays. The number of requests forming a unit of interleaving may be modified, the number of blocks of host data to have their requests interleaved may be modified, a maximum number of requests to a block of host data may be modified, and/or other aspects of an interleaving scheme may be modified. For example, detecting one or more patterns of host responses to host memory access requests and selecting the interleaving scheme according to a pattern detected. Such detecting may be performed continuously, or periodically, during a product lifetime, e.g. performed at two or more times during a product lifetime, and the interleaving scheme may be newly selected at each of the two or more times according to one or more patterns of host responses to host memory access requests identified during operation of a prior interleaving scheme. For example, the pattern detected may include slow host responses to interleaved host memory read requests for a first number of blocks and the interleaving scheme may be selected to interleave host memory read requests for a second number of blocks that is greater than the first number of blocks.

Figure 12B:
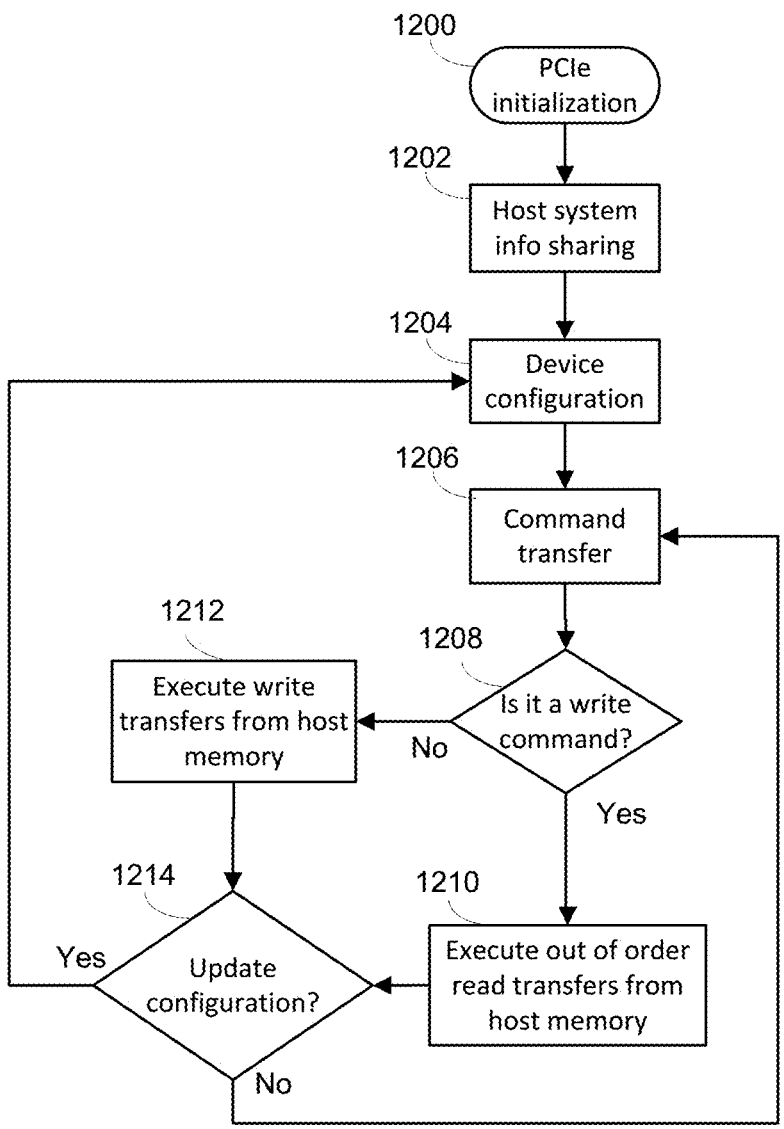

FIG. 12B shows an example of a method of operating a memory interface such as an NVMe interface, which is similar to the method of FIG. 12 with the addition of an optional step to update an interleaving scheme. After PCIe initialization 1200, if a host supports it, host system information sharing 1202 occurs to indicate to the NVMe controller one or more host memory characteristics, e.g. control circuits in a data storage system (e.g. control circuits 508 in data storage device 500) receive one or more indicators of host memory characteristics through the host interface. Subsequent device configuration 1204 may be based on host memory characteristics, e.g. an NVMe controller may determine an interleaving scheme according to the one or more indicators of host memory characteristics. Where a host does not support information sharing, a default interleaving scheme may be used. Subsequently, in response to a command transfer 1206, a determination is made as to whether it is a write command 1208. If it is a write command 1208 then host memory access requests (i.e. read requests directed to data in host memory to be written in non-volatile memory) are subject to an interleaving scheme to execute out of order read transfers from host memory 1210. If it is not a write command 1208, i.e. it is a read command, then the host may execute write transfers from host memory 1212, i.e. transfers data from non-volatile memory and write it in host memory. In either case (read or write command 1208), a determination is made as to whether to update configuration 1214, e.g. whether the host memory responses to host memory access requests correspond to any pattern and if a predetermined pattern is detected to modify the interleaving scheme in response. For example, if host memory access requests for two blocks of host data are interleaved and the host memory responses are slow, it may indicate that requests for more than two blocks of host data should be interleaved and the configuration may be updated accordingly, e.g. an interleaving scheme may be modified to interleave host memory access requests for three or more blocks of host data.

Figure 12C:
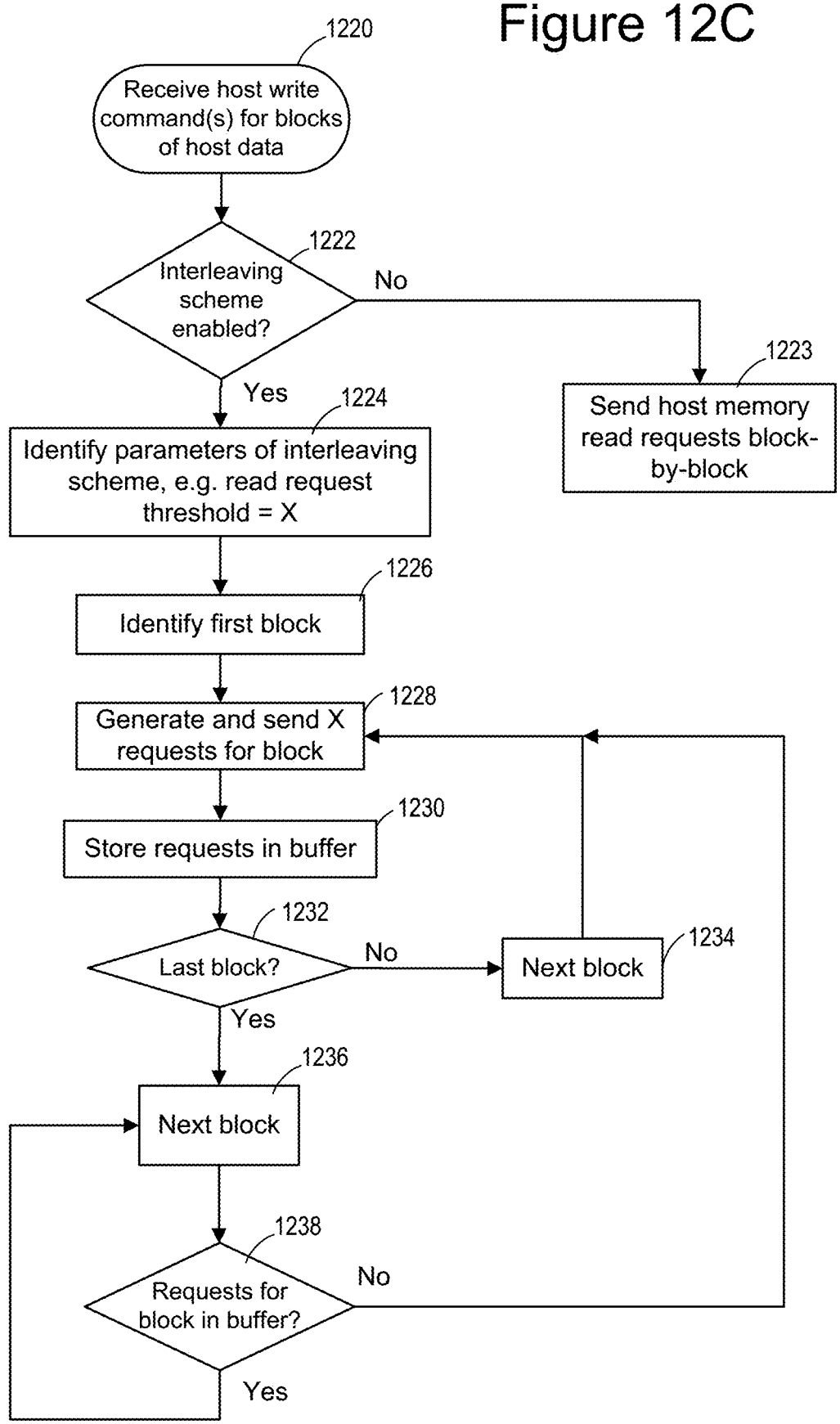

FIG. 12C shows an example of how a write command, or write commands, from a host may be managed, e.g. in by an NVMe controller such as NVMe controller 512. The process of FIG. 12C illustrates an example of execution of out of order read transfers 1210 of FIG. 12A-B. In response to receiving host write command(s) for blocks of host data 1220, a determination is made as to whether an interleaving scheme is enabled 1222. If no interleaving scheme is enabled then host memory read requests are sent block-by-block 1223, i.e. all host memory read requests of a block are sent in series, followed by all host memory read requests of the next block, and so on. If an interleaving scheme is enabled, the parameters of the interleaving scheme are identified 1224, for example a read request threshold=X (see examples of FIGS. 11A-B where X=3 and X=5 respectively). A first block of host data is identified 1226 and the first X host memory read requests for the block are generated and sent 1228. These requests are also stored in a request buffer 1230, e.g. in request buffer 514. A determination is made as to whether the current block of host data is the last block 1232 (i.e. last of the blocks to be interleaved). If it is not the last block, then the process moves to the next block 1234 and generates and sends requests for the next block 1228 and stores the requests in the request buffer 1230. When the last block is encountered, the process moves to the next block in cyclical order 1236, i.e. to the first block, and a determination is made as to whether there are any requests for this block of host data in the request buffer 1238. If there are no requests for this block of host data in the request buffer, then adding more requests for this block is allowed and the process generates and sends another X requests for the block 1228. If there are requests for the block in the request buffer, then the process moves to the next block 1238 until it finds a block for which there are no corresponding entries in the request buffer. In this way, if requests for a particular block are delayed, then the process moves on to another block or blocks and any delays encountered by requests of a block do not stop operation of the interface.

FIG. 12D shows an example of how an adaptive interleaving scheme may be implemented according to host responses. The process of FIG. 12D may be implemented by control circuits in a data storage system, e.g. by an NVMe controller such as NVMe controller 512. Host responses to memory access requests are monitored 1240. For example, the time for a host to respond to host memory read requests may be tracked over a period of time, i.e. time to return the data requested. This may be done on a block basis, die basis, or otherwise. Pattern detection 1242 may identify a pattern of host responses that corresponds to one or more predetermined patterns that can be addressed using different interleaving schemes. Accordingly, if a predetermined pattern is detected then a corresponding interleaving scheme is selected according to the detected pattern 1244. For example, a detected pattern may include slow host responses to interleaved host memory read requests for a first number of blocks and in response, an interleaving scheme may be selected to interleave host memory read requests for a second number of blocks that is greater than the first number of blocks. If no pattern is detected then monitoring may be resumed. The process of FIG. 12D may be operated continuously or periodically. For example, detecting one or more patterns of host responses to host memory access requests may be performed at two or more times during a product lifetime and the interleaving scheme may be newly selected at each of the two or more times according to one or more patterns of host responses to host memory access requests identified during operation of a prior interleaving scheme FIG. 13 shows an example of a method that may be implemented using hardware described above, e.g. in data storage device 500 of FIG. 5. The method includes receiving one or more host write commands directed to a plurality of blocks of host data to be stored in a non-volatile memory 1300. The method also includes, in response to the one or more host write commands, generating a plurality of host memory access requests including at least a first plurality of host memory access requests directed to a first block of host data stored in a host memory and a second plurality of host memory access requests directed to a second block of host data stored in the host memory 1302. And ordering the first plurality of host memory access requests and the second plurality of host memory access requests according to an interleaving scheme to distribute host memory access requests to the host memory between at least the first block of host data and the second block of host data 1304.

Figure 14:
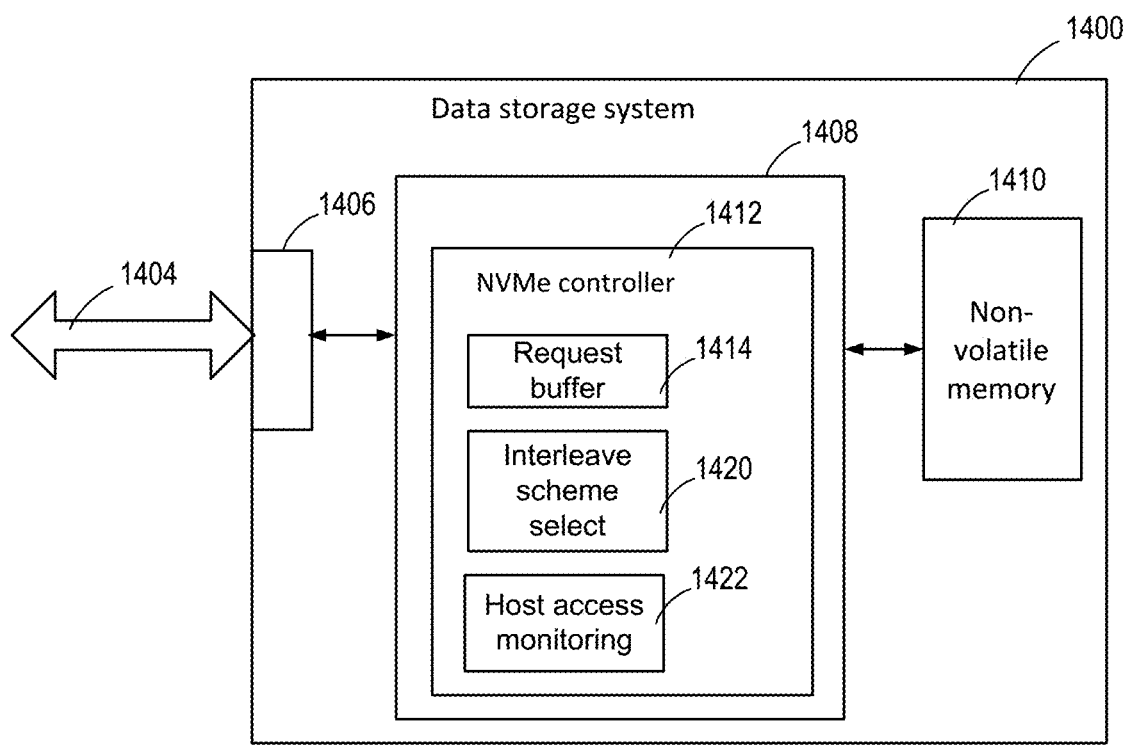
FIG. 14 shows an example of a data storage device connected to a host.

FIG. 14 shows an example of hardware components that may be used to implement techniques described above, e.g. methods of FIGS. 10A-13. FIG. 14 shows an example of a data storage device 1400 connected to a host 1402 through an interface 1404. For example, interface 1404 may be an NVMe interface and may operate accordingly (e.g. a block of host data may hold 4 KB of host data and an individual request for a portion of host data may be 128 KB of host data). Data storage device 1400 includes interface circuits 1406 (e.g. physical interface) connected to control circuits 1408 (e.g. controller 122 of FIG. 3), which are connected to non-volatile memory 1410 (e.g. non-volatile memory 108 of FIG. 3, which may include a set of non-volatile memory cells located in one or more non-volatile memory dies and may include a 3-D memory structure such as three-dimensional non-volatile memory structure 126). Control circuits 1408 include NVMe controller 1412 and request buffer 1414 (which is shown as part of NVMe controller 1412 in this example but may be a separate component in some cases). NVMe controller 1412 is configured to apply an interleaving scheme to host memory access requests sent through interface 1404 and may be considered a means for requesting portions of host data of a plurality of blocks of host data in a host memory in an interleaved order through the host interface in response to one or more commands to write the plurality of blocks of host data in the non-volatile memory. NVMe controller 1412 is configured to respond to one or more write commands directed to non-volatile memory 1410 received through the interface 1404 by interleaving requests for portions of data of a plurality of blocks of host data of one or more write commands stored in host DRAM. NVMe controller 1412 includes interleave scheme select circuit 1420 configured to select an interleave scheme and host access monitoring circuit 1422 configured to monitor host responses to host memory access requests (e.g. as illustrated in FIG. 2D). Request buffer 1414 stores interleaved host memory access requests in the interleaved order and may be considered a means for storing requests for the portions of host data in the interleaved order until the requests for the portions of host data are fulfilled from the host memory, the means for storing requests having capacity to store a number of requests that is less than or equal to the number of requests corresponding to a block of host data. Request buffer 1414 is configured to hold interleaved requests for the portions of data of the plurality of blocks of host data.

An example of a system includes: a host interface; a set of non-volatile memory cells; and one or more control circuits coupled to the host interface and coupled to the set of non-volatile memory cells, the one or more control circuits configured to access a host memory through the host interface by sending host memory access requests for two or more blocks of host data according to an interleaving scheme.

The host interface may be a Non-Volatile Memory express (NVMe) interface and the one or more control circuits may include a NVMe controller. The two or more blocks of host data may be blocks of a first size and the host memory access requests may be requests of a second size that is smaller than the first size such that a plurality of host memory access requests correspond to a block of host data. The system may include a request buffer configured to hold entries corresponding to host memory access requests sent through the host interface. The request buffer may have a capacity to hold a number of requests that is less than or equal to the number of requests of a block of host data. The one or more control circuits may be configured to receive host write commands through the host interface, to access the host memory through the host interface in response to one or more host write commands by sending host memory read requests for the two or more blocks of host data according to the interleaving scheme, and to maintain the host memory read requests in the request buffer. The one or more control circuits may be configured to receive one or more indicators of host memory characteristics through the host interface and to determine the interleaving scheme according to the one or more indicators of host memory characteristics. The one or more control circuits may be configured to detect one or more patterns of host memory responses to host memory access requests and to modify the interleaving scheme in response to a pattern of host memory responses. The set of non-volatile memory cells may be formed in a non-volatile memory that is monolithically formed in one or more physical levels of arrays of memory cells having an active area disposed above a silicon substrate.

An example of a method includes: receiving one or more host write commands directed to a plurality of blocks of host data to be stored in a non-volatile memory; in response to the one or more host write commands, generating a plurality of host memory access requests including at least a first plurality of host memory access requests directed to a first block of host data stored in a host memory and a second plurality of host memory access requests directed to a second block of host data stored in the host memory; and ordering the first plurality of host memory access requests and the second plurality of host memory access requests according to an interleaving scheme to distribute host memory access requests to the host memory between at least the first block of host data and the second block of host data.

The method may include receiving from a host one or more indicators of host memory characteristics and identifying the interleaving scheme according to the one or more indicators of host memory characteristics. The one or more indicators of host memory characteristics may include at least one of: page size, number of banks, and cache status. Identifying the interleaving scheme may include identifying a number of blocks of host data for the interleaving scheme, identifying a number of host memory access requests in a unit of interleaving, or identifying a maximum number of host memory access requests per block of host data. The method may include detecting one or more patterns of host responses to host memory access requests and selecting the interleaving scheme according to a pattern detected. The pattern detected may include slow host responses to interleaved host memory read requests for a first number of blocks and the interleaving scheme may be selected to interleave host memory read requests for a second number of blocks that is greater than the first number of blocks. Detecting one or more patterns of host responses to host memory access requests may be performed at two or more times during a product lifetime and the interleaving scheme may be newly selected at each of the two or more times according to one or more patterns of host responses to host memory access requests identified during operation of a prior interleaving scheme.

An example of an apparatus includes: a non-volatile memory; a host interface; and means for requesting portions of host data of a plurality of blocks of host data in a host memory in an interleaved order through the host interface in response to one or more commands to write the plurality of blocks of host data in the non-volatile memory.

The apparatus may further include means for storing requests for the portions of host data in the interleaved order until the requests for the portions of host data are fulfilled from the host memory, the means for storing requests having capacity to store a number of requests that is less than or equal to the number of requests corresponding to a block of host data. The host interface may be a Non-Volatile Memory Express (NVMe) over Peripheral Component Interface express (PCIe) interface, a block of host data may hold a first amount of host data, an individual request may be for a second amount of host data, and the second amount may be a fraction of the first number.

An example of an apparatus includes: a non-volatile memory; a Non-Volatile Memory Express (NVMe) interface; a controller coupled to the non-volatile memory and to the NVMe interface, the controller comprising: an NVMe controller configured to respond to one or more write commands directed to the non-volatile memory received through the NVMe interface by interleaving requests for portions of data of a plurality of blocks of host data of the one or more write commands stored in host Dynamic Random Access Memory (DRAM); and an NVMe request buffer configured to hold interleaved requests for the portions of data of the plurality of blocks of host data.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A system, comprising:
   a host interface;
   a set of non-volatile memory cells; and one or more control circuits coupled to the host interface and coupled to the set of non-volatile memory cells, the one or more control circuits configured to receive through the host interface one or more host write commands directed to a plurality of blocks of host data to be stored in the set of non-volatile memory cells, in response to the one or more host write commands, generate a plurality of host memory access requests including at least a first plurality of host memory access requests directed to a first block of host data stored in a host memory and a second plurality of host memory access requests directed to a second block of host data stored in the host memory, detect a pattern of slow host responses to host memory access requests for a first number of blocks, select an interleaving scheme according to the pattern detected, wherein the interleaving scheme is selected to interleave host memory access requests for a second number of blocks that is greater than the first number of blocks, and order the first plurality of host memory access requests and the second plurality of host memory access requests according to the interleaving scheme to distribute host memory access requests to the host memory between at least the first block of host data and the second block of host data.

2. The system of claim 1 wherein the host interface is a Non-Volatile Memory express (NVMe) interface and the one or more control circuits include a NVMe controller.

3. The system of claim 2 wherein each of the two or more blocks of host data are blocks of a first size and the host memory access requests are requests of a second size that is smaller than the first size such that a plurality of host memory access requests correspond to a block of host data.

4. The system of claim 1 further comprising a request buffer configured to hold entries corresponding to host memory access requests sent through the host interface.

5. The system of claim 4 wherein the request buffer has a capacity to hold a number of requests that is less than or equal to the number of requests of a block of host data.

6. The system of claim 4 wherein the one or more control circuits are configured to access the host memory through the host interface in response to the one or more host write commands by sending host memory read requests for the first and second blocks of host data according to the interleaving scheme, and to maintain the host memory read requests in the request buffer.

7. The system of claim 1 wherein the one or more control circuits are configured to receive one or more indicators of host memory characteristics through the host interface and to determine the interleaving scheme according to the one or more indicators of host memory characteristics.

8. The system of claim 1 wherein the one or more control circuits are configured to modify the interleaving scheme in response to a pattern of slow host memory responses by increasing a number of blocks of host data included in the interleaving scheme.

9. The system of claim 1 wherein the set of non-volatile memory cells are formed in a non-volatile memory that is monolithically formed in one or more physical levels of arrays of memory cells having an active area disposed above a silicon substrate.

10. The system of claim 1 wherein the one or more control circuits are further configured to modify the interleaving scheme in response to a slow pattern of host responses to host memory access requests by increasing a number of blocks of host data included in the interleaving scheme.

11. A method, comprising:
receiving one or more host write commands directed to a plurality of blocks of host data to be stored in a non-volatile memory;
in response to the one or more host write commands, generating a plurality of host memory access requests including at least a first plurality of host memory access requests directed to a first block of host data stored in a host memory and a second plurality of host memory access requests directed to a second block of host data stored in the host memory;
detecting a pattern of slow host responses to host memory access requests for a first number of blocks;
selecting an interleaving scheme according to the pattern detected, the interleaving scheme selected to interleave host memory access requests for a second number of blocks that is greater than the first number of blocks; and
ordering the first plurality of host memory access requests and the second plurality of host memory access requests according to the interleaving scheme to distribute host memory access requests to the host memory between at least the first block of host data and the second block of host data.

12. The method of claim 11 further comprising receiving from a host one or more indicators of host memory characteristics and identifying the interleaving scheme according to the one or more indicators of host memory characteristics.

13. The method of claim 12 wherein the one or more indicators of host memory characteristics include at least one of: page size, number of banks, and cache status.

14. The method of claim 12 wherein identifying the interleaving scheme includes at least one of: identifying a number of blocks of host data for the interleaving scheme, identifying a number of host memory access requests in a unit of interleaving, or identifying a maximum number of host memory access requests per block of host data.

15. The method of claim 11 wherein the pattern detected includes slow host responses to interleaved host memory read requests for the first number of blocks and wherein the interleaving scheme is selected to interleave host memory read requests for the second number of blocks.

16. The method of claim 11 wherein the detecting one or more patterns of host responses to host memory access requests is performed at two or more times during a product lifetime and the interleaving scheme is newly selected at each of the two or more times according to one or more patterns of host responses to host memory access requests identified during operation of a prior interleaving scheme.

17. An apparatus comprising:
a non-volatile memory;
a host interface; and
means for receiving through the host interface one or more host write commands directed to a plurality of blocks of host data to be stored in the non-volatile memory, in response to the one or more host write commands, generating a plurality of host memory access requests including at least a first plurality of host memory access requests directed to a first block of host data stored in a host memory and a second plurality of host memory access requests directed to a second block of host data stored in the host memory, detecting a pattern of slow host responses to host memory access requests for a first number of blocks, selecting an interleaving scheme according to the pattern detected, the interleaving scheme selected to interleave host memory access requests for a second number of blocks that is greater than the first number of blocks, and ordering the first plurality of host memory access requests and the second plurality of host memory access requests according to the interleaving scheme to distribute host memory access requests to the host memory between at least the first block of host data and the second block of host data.

18. The apparatus of claim 17 further comprising:
means for storing requests for the portions of host data in the interleaved order until the requests for the portions of host data are fulfilled from the host memory, the means for storing requests having capacity to store a number of requests that is less than or equal to the number of requests corresponding to a block of host data.

19. The apparatus of claim 18 wherein the host interface is a Non-Volatile Memory Express (NVMe) over Peripheral Component Interface express (PCIe) interface, a block of host data holds a first amount of host data, an individual request is for a second amount of host data, and the second amount is a fraction of the first amount.

20. An apparatus comprising:
a non-volatile memory;
a Non-Volatile Memory Express (NVMe) interface;
a controller coupled to the non-volatile memory and to the NVMe interface, the controller comprising:
an NVMe controller configured to receive through the NVMe interface one or more host write commands directed to a plurality of blocks of host data to be stored in the non-volatile memory, in response to the one or more host write commands, generate a plurality of host memory access requests including at least a first plurality of host memory access requests directed to a first block of host data stored in a host memory and a second plurality of host memory access requests directed to a second block of host data stored in the host memory, detect a pattern of slow host responses to host memory access requests for a first number of blocks, select an interleaving scheme according to the pattern detected, the interleaving scheme selected to interleave host memory access requests for a second number of blocks that is greater than the first number of blocks, and order the first plurality of host memory access requests and the second plurality of host memory access requests according to the interleaving scheme to distribute host memory access requests to the host memory between at least the first block of host data and the second block of host data; and
an NVMe request buffer configured to hold the first plurality of host memory access requests and the second plurality of host memory access requests interleaved according to the interleaving scheme.

* * * * *